Oct. 18, 1966    I. V. RONDAS    3,279,708
ELECTRICAL SOLENOID WINDING MACHINES
Filed July 2, 1962    7 Sheets-Sheet 1

Fig.1

INVENTOR:
Ivan V. Rondas

Louis A. Kline
By John T. Matlago
Richard T. Lempel
His Attorneys

Oct. 18, 1966 I. V. RONDAS 3,279,708
ELECTRICAL SOLENOID WINDING MACHINES
Filed July 2, 1962 7 Sheets-Sheet 4

Fig. 10 (Timing Diagram)

Fig. 7

INVENTOR
Ivan V. Rondas

His Attorneys

Oct. 18, 1966  I. V. RONDAS  3,279,708
ELECTRICAL SOLENOID WINDING MACHINES
Filed July 2, 1962  7 Sheets-Sheet 5

INVENTOR
Ivan V. Rondas
His Attorneys

United States Patent Office 3,279,708
Patented Oct. 18, 1966

3,279,708
ELECTRICAL SOLENOID WINDING MACHINES
Ivan V. Rondas, Redondo Beach, Calif., assignor to The National Cash Register Company, Dayton, Ohio, a corporation of Maryland
Filed July 2, 1962, Ser. No. 206,759
22 Claims. (Cl. 242—9)

The present invention is directed to an electrical solenoid winding machine and more particularly to a machine for winding solenoids in a new and improved manner.

In the prior art, many solenoid winding machines have been developed for forming solenoids or coils on rotating spools, rotating mandrels and the like. There are, however, many applications in which it is not feasible or it is undesirable to rotate the structure or form upon which the solenoids are formed. One example of such an application is the structure for assembling arrays of solenoids for bistable magnetic rods of a magnetic information store, as shown and described in a copending U.S. patent application, Serial No. 741,583, now U.S. Patent No. 3,051,930, of H. E. Austen, having a common assignee. A single one of the many arrays of solenoids shown in the aforementioned application comprises a panel consisting of one hundred solenoids in which the solenoids are arranged in rows and columns of a solenoid plane and the axes of the solenoids are parallel to one another and perpendicular to the solenoid plane. Multiple panels of solenoid arrays having the same spacing and pattern are placed in congruence in a stack so that the central openings of corresponding solenoids in the respective solenoid plane are in axial alignment to receive respective bistable magnetic rods. As disclosed therein, each of the solenoids in each row of any one panel is formed sequentially from a single continuous conductor whereby drive lines are provided for magnetically storing binary information in the respective solenoids of each row. Also, as disclosed, each panel is individually constructed by: (1) winding an array of solenoids on an array of solenoid form projections of a die plate, and (2) investing the solenoids in solid, dielectric material to secure the solenoids in their relative positions as formed on the die plate whereby a thin flat panel array is provided for a three dimensional magnetic rod memory or information store structure. This solution presents advantageous means for achieving a fast and economical assembly of magnetic rod information store for information processing systems.

In copending U.S. patent applications of Donal A. Meier, Serial Nos. 795,934, now Patent No. 3,228,012 and 796,892, now Patent No. 3,134,965, having a common assignee, there are disclosed, magnetic rods of very small diameter in the order of .01 inch, and solenoids of a comparable diameter into which the magnetic rods are adapted for use to form a magnetic information store having many unique advantages. For the most efficient operation of the information store of the class therein generally described it is very desirable that the solenoids be closely wound and that the several different windings or coils of the respective units be compactly formed, to reduce magnetic and electrical losses to minimum values. As indicated in the aforementioned copending applications of Donal A. Meier, an information store may comprise one or more sets of solenoid units, each solenoid unit comprising a magnetic rod and a plurality of electrically separate concentrically disposed solenoids closely encircling and inductively linked to the magnetic rod. There are many modes of connecting the separate solenoids of a unit with corresponding solenoids of other units. While it is evident that it would be preferable to form all those solenoids that are electrically connected in series from a continuous length of conductor, difficulty is experienced in doing this if the individual solenoids are of single-layer construction. In another copending U.S. patent application of Donal A. Meier, Serial No. 20,494, now Patent No. 3,184,720, having a common assignee, an improved process of producing a solenoid array adapted for use with removable magnetic rods is disclosed which, although providing substantial improvements therein, requires manual winding of the solenoids.

While the invention disclosed in the copending patent applications have many advantages over the prior art, the preferred embodiments of the present invention provide a substantial economic advantage in that it avoids the need of manual winding of solenoids by providing machines for precise winding of solenoids uniformly and accurately to produce an improved solenoid array. These machines are capable of automatically producing said improved arrays at a high rate of speed, and therefore at a much lower cost. Extensive use of magnetic rods for the purpose of storing binary information in the data processing information handling systems now requires a simple and expeditious means for assembling and winding magnetic rod memory circuits.

In an alternate arrangement of the present invention, a machine has been provided for winding solenoids on non-rotatable solenoid forms wherein adjustment means are provided for controlling the number of turns of the solenoids. This alternate arrangement of the present invention also discloses various modifications of the preferred embodiment of the present invention which are within the scope of the present invention. In addition, this alternate arrangement discloses a machine which provides certain advantages in winding solenoids which are individually placed on cylindrical magnetic elements for memories or parametrical apparatus for information processing. Parametrical apparatus using such magnetic elements is shown and described in a copending U.S. patent application, Serial No. 43,801, of B. A. Kaufman, having a common assignee. Whether the magnetic elements are used in memories or parametrical apparatus, it is extremely important that the number of turns and the pitch of the windings and the diameter of the solenoids be precisely and accurately controlled. This alternate arrangement of the present invention thus provides for accurately winding a large number of solenoids having the desired characteristics hereinbefore described and also provides an adjustment for accurately controlling the number of turns of the solenoids.

Accordingly, it is an object of the present invention, to provide a machine for producing coordinate arrays of solenoids or coils.

It is another object of this invention to provide a machine for the automatic winding of conductors into a solenoid array including the winding of a plurality of individual solenoids, whose axes are parallel and perpendicular to the plane of the array.

Another object of the present invention is to provide a machine for producing a rectangular array of solenoids arranged in rows and columns wherein the solenoids of each row are wound simultaneously and the solenoids of each column are formed from a continuous conductor.

Still another object of this invention is to provide a machine for accurately winding fine-gauge conductors to produce uniform solenoids having the exact number of turns and providing for the precise placement of turns.

A further object of the invention is to provide a machine for accurately winding solenoids on a non-rotatable form member.

Another object of the present invention is to eliminate the need for manual winding of solenoids on solenoid forms or the need to rely primarily on the use of guides on each form for positioning conductors in the accurate forming of solenoids.

Still another object of the present invention is to provide for axial rotation of continuous length conductors being fed to solenoid forms to prevent twisting of the conductors during winding of the conductors on the forms whereby knotting, entangling and breakage of the conductors being fed from supply reels to the solenoids are prevented.

Another object of this invention is to provide a multiple solenoid winding machine for winding a plurality of solenoids simultaneously without the need of rotating mandrels or other rotating solenoid forms.

Still another object is to provide a machine for winding a solenoid array on a removable solenoid array form which form provides a mold for investing the solenoid array.

Other objects and features of the invention will become apparent to those skilled in the art as a disclosure is made in the following detailed description of a preferred embodiment of the invention as illustrated in the accompanying sheets of drawings in which.

Figure 1:
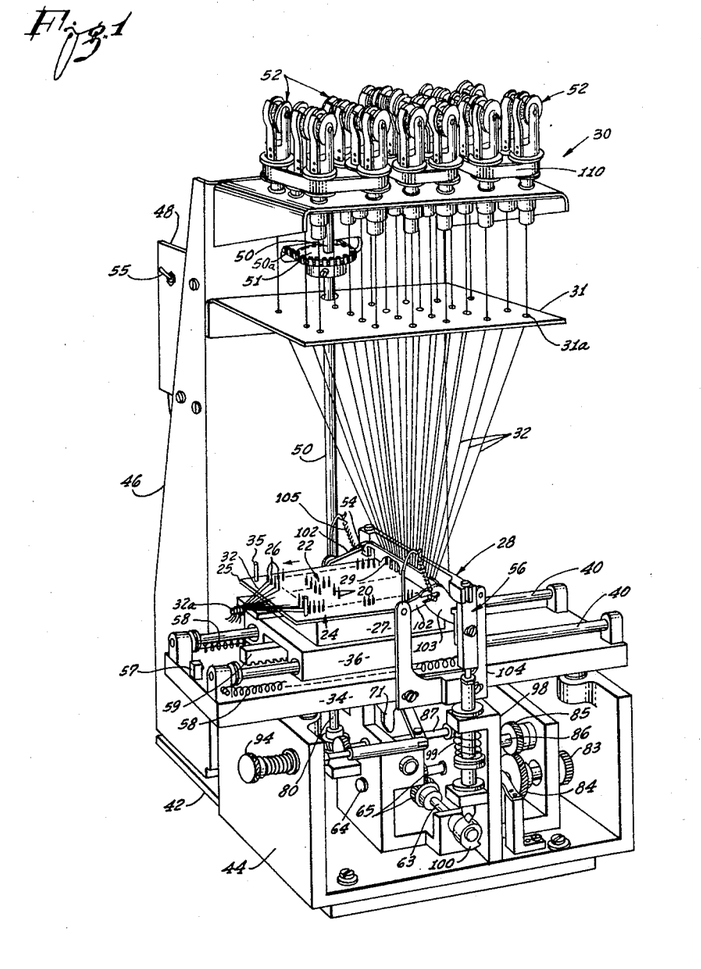
FIG. 1 is a perspective view of one solenoid winding machine showing a preferred illustrative embodiment of the present invention for winding solenoid arrays.

Referring now to the drawings, wherein like reference characters designate like or corresponding parts throughout the several views, FIG. 1 illustrates a preferred embodiment of a solenoid winding machine using the principles of the present invention. The machine has a base plate 42 which supports a housing 44 on top of which an oscillating table 34 is mounted. The table 34 slidably supports an indexing table 36. A mounting block 27 is removably secured onto the indexing table 36 to support a solenoid array form 24 for movement below a conductor guide or feed tube head 28. The machine provides for winding individual solenoids 20 of a solenoid array 22 on pins 26 mounted in die plate 25 of array form 24. For clarity, only some of the pins 26 are shown in FIG. 1 of the drawings. The array form 24 actually includes equally spaced pins 26 arranged in rows disposed parallel to the head 28 and in columns transverse thereto. A conductor supply 30 is supported above the head 28, as shown, for supplying conductors 32 thereto for winding the solenoids 20.

The machine shown in FIG. 1 winds individual solenoids 20, a row at a time, to produce the solenoid array 22 on the array form 24. As illustrated in FIG. 1, the machine is in the process of completing the winding of the last row of individual solenoids 20 of the flat, rectangular solenoid array 22.

The solenoid array 22 includes solenoids 20 arranged in rows and columns corresponding to the location of individual solenoid forms or pins 26 of the array form 24. The solenoid array 22 is wound, a row at a time, by indexing the array form 24 to successively position each row of pins 26 under the conductor feed tube head 28. Each time a row of pins 26 is located under the head 28, the array form 24 is set into oscillatory motion by actuating table 34 so that the pins 26 in the indexed row revolve around respective conductor feed tubes 29 of the head 28. The pitch of the turns of the solenoids 20 is controlled by moving the head 28 upwardly during the winding of each row of solenoids. After all the rows of the pins on the solenoid array 22 have been so wound, the solenoid array form 24, including the pins 26 mounted in the die plate 25, is removed from the machine. The die plate 25 forms one surface of a mold for investing the solenoid array 22 in solid, dielectric material. After curing, the invested solenoid array is removed from the array form 24 to provide a solenoid panel (not shown). Multiple solenoid panels produced in this manner can be stacked with magnetic rods inserted through corresponding solenoids in each panel to form a magnetic rod information store for an information processing system.

The solenoid winding machine, shown in FIG. 1, comprises conductor supply 30 for supplying twenty-two continuous length conductors 32 to respective feed tubes 29 of the head 28. The twenty-two feed tubes 29 feed succeeding portions of the conductors 32 to the respective pins 26 to wind an indexed row of solenoids 20. Indexing of successive rows of pins 26 below the head 28 provides for sequentially winding the rows of the solenoid array 22 with solenoids 20. Each of the solenoids 20 in a column is connected in series and formed from respective continuous length conductors 32.

The lower portion of the solenoid winding machine as shown in FIG. 1 includes a drive mechanism for producing a combination of movements for winding the solenoids 20 of the solenoid array 22. These movements comprise: (1) a horizontal linear movement of indexing table 36 for indexing each row of pins 26 successively under the head 28; (2) a circular oscillatory motion of table 34 in a horizontal plane for revolving the respective pins 26 of an indexed row of pins positioned under head 28, around respective feed tubes 29 of head 28, for winding the solenoids 20; and (3) an upward vertical movement of the feed tube head 28 during the winding of each row to provide for the pitch in the turns of the solenoids 20. The combination of these three movements and the movement of a follow bar 54 provides for the winding of a complete solenoid array 22. The timing of these movements is illustrated for a typical row winding cycle by the diagram of FIG. 10.

Figures 6, 7, 10:
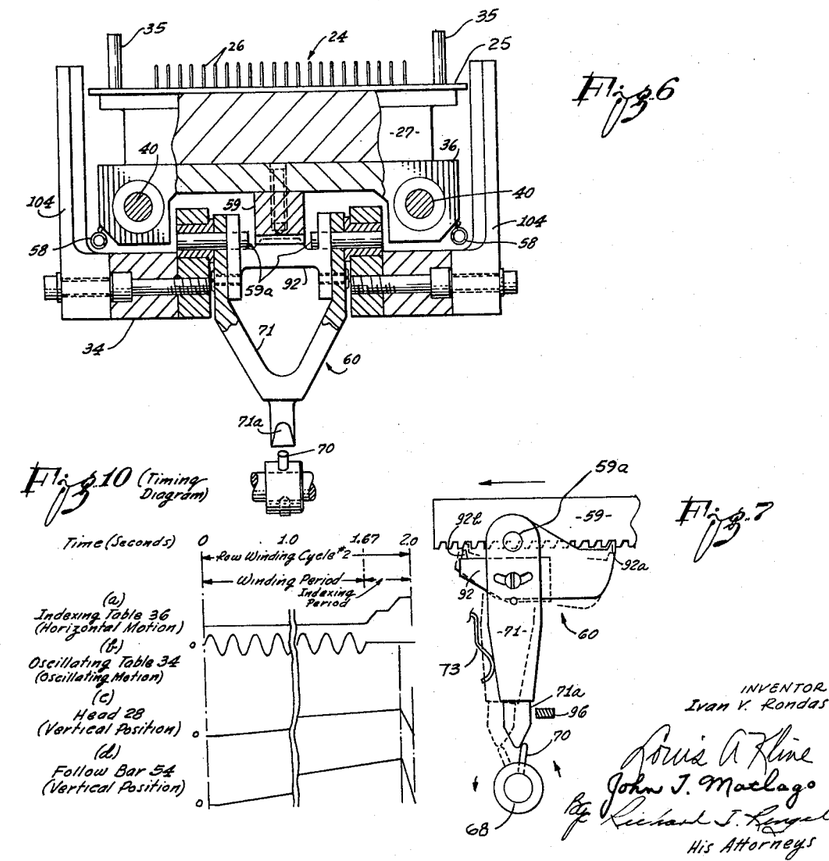
FIG. 6 is a vertical sectional view of the lower winding table of the machine taken along the line 6—6 of FIG. 5, and an end view of the upper winding table which is partially broken away to show additional details of the escapement apparatus shown in the top view of FIG. 5.
FIG. 7 is a detail view of the rack and escapement apparatus including the double escapement member for illustrating its operation.
FIG. 10 is a timing diagram for illustrating the operation of the machine of the preferred embodiment of the present invention shown in FIG 1.

The horizontal linear movement of the indexing table 36 to position the next succeeding row of pins 26 under head 28 is performed by two successive incremental movements as illustrated by the timing diagram of FIG. 10(a). This movement of the indexing table 36 is from the right to the left side of the lower table 34, on guide rails 40, as shown. This two-step incremental movement of the indexing table 36 is produced at the end of each row winding cycle of the machine, to index the following row of pins 26 below the head 28 for sequentially winding each row of solenoids 20 in the array 22. The winding cycle shown in FIG. 10(a) is repeated for each row of pins 26 of the array form 24 positioned under the head 28. The winding of the pins in a row is accomplished by the combination of the two synchronized movements, i.e., the circular, oscillatory movement of the table 34 (FIG. 10(b)) and the upward, vertical movement of the head 28 (FIG. 10(c)). The circular oscillatory motion of the table 34 causes a row of pins 26, which is indexed under the head 28, to move in a circular path about respective feed tubes 29 for winding conductors 32 around the pins 26. The upward, vertical movement of the head 28, during the oscillatory motion of the pins 26, positions the conductors 32 vertically on respective pins 26 to produce a single layer of turns of a predetermined pitch on each of the pins of the row of pins indexed under the head 28. The movement of the head 28 during each row winding period of a cycle is in an upward direction, that is in a direction parallel to the axes of the solenoids 20, as illustrated in FIG. 10(c). The downward, vertical movement of the head 28 is produced immediately upon completion of the horizontal movement (indexing) of the indexing table 36, whereby the lower ends of the row of feed tubes 29 are positioned near the base of respective pins 26 at the beginning of each period of oscillatory movement of the lower table 34.

Referring now to FIG. 1 for a more detailed description of the structure of the solenoid winding machine which is shown therein, the main support and housing structure is shown to comprise base plate 42 upon which housing 44 is mounted on the forward end thereof, and vertical support member 46 is mounted on the rear portion thereof. Member 46 supports the conductor supply 30 and a motor 49 (FIG. 11) which is fastened to a rear plate 48. The motor 49 drives a main power shaft 50 (FIG. 1) by a link belt 50a coupled to a pulley 51. The upper end of the shaft 50 is coupled to each of the rotatable supply reel units 52 whereby each of the reel units 52 is rotated, about vertical axes, one revolution for each turn being wound on the respective solenoids 20, to prevent twisting of the conductors 32 during the winding operation. The lower end of the main power shaft 50 is coupled to actuate the winding tables 34 and 36 by gear drives and eccentrics located in the housing 44 and thereby produce the oscillatory and linear movements of the lower table 34 and the upper indexing table 36, respectively.

In the preferred illustrative embodiment of the machine shown in FIG. 1, twenty-two conductors 32 are supplied from twenty-two rotatable supply-reel units 52 to a corresponding number of feed tubes 29. The terminal leads of the conductors 32 are secured to the terminal lead post 32a prior to starting the machine whereby the conductors 32 are pulled from the respective supply reel units 52 during the winding of the solenoid array 22.

As the conductors 32 are fed from the feed tubes 29, they are wound simultaneously on respective pins 26 of the indexed row below the head 28 to produce twenty-two solenoids 20 in a single row winding cycle. A follow bar 54, which is coupled to movable, vertical head mounting assemblies 56 for the head 28, moves in synchronism with the head 28 to position portions of the conductors 32 being fed from the feed tubes 29 against the die plate 25 at the beginning of each row winding cycle, as shown in FIG. 8d.

Each row of pins 26 is positioned under the head 28 by indexing the upper table 36 which is slidably mounted on rails 40. The indexing table 36 is urged to the left of the lower table 34, as shown in FIG. 1, by tension coil springs 58 and indexed by an escapement assembly 60 including a rack 59 that is fastened to the bottom of the indexing table 36 and escapement member 71 (FIG. 7). The escapement assembly 60 provides for the two-step, horizontal, linear movement of the indexing table 36 from the right side to the left side of the lower table 34 to position each row of pins 26, in turn, under the head 28. After the last row of solenoids 20 is wound, the escapement assembly 60 permits the indexing table 36 to move, under the force exerted by springs 58, to the end of its travel on table 34 where the end of the rack 59 engages switch 57 to turn off the motor 49. When the solenoid array form 24 is clear of the head 28 it is lifted from the mounting block 27, upon which it is removably secured, for investment in solid dielectric material and a new form 24 is placed on the mounting block 27. The indexing table 36 is then manually moved to the opposite (right) end of table 34, against the force exerted by the springs 58, where the escapement assembly 60 positions the first row of pins 26 under the head 28 for winding the next solenoid array.

In operation, a solenoid array form 24 is placed on the mounting block 27 and positioned thereon by alignment posts 35 when the indexing table 36 is at either end of its travel on rails 40. When the table 36 is located at the right end of its travel on guide rails 40, the terminal post 32a on the mounting block 27 is located near the head 28 and the conductors 32 are easily wrapped around post 32a to secure them for the winding operations to follow. A toggle switch 55 is then operated to turn on the motor 49 (FIG. 11) and the winding operation commences on the first row of pins 26. The head 28 and follow bar 54 will move to the bottom of their vertical travel adjacent the first row of pins 26 (FIG. 8d) to begin the first row winding cycle for winding the first row of pins 26 of the array form 24. During the winding of the solenoid array 22 shown in FIG. 1, which is illustrative, twenty-six rows of solenoids 20 are wound in the same number of row winding cycles. In the preferred illustrative embodiment of the machine constructed according to the present invention, a motor 49, having a reduced output speed of 300 r.p.m., winds solenoids at a rate of 300 turns per minute. Each of the reel units 52 is revolved at this speed to prevent twisting of the conductors 32 during the winding operation. Also, according to the preferred illustrative embodiment, each of the solenoids 20 has ten turns, therefore, the solenoid array 22, having twenty-six rows, is completed in less than one minute. After completion of the winding of the solenoid array 22, the array form 24 is removed from the mounting block 27 and the conductors 32 are cut to provide adequate terminal leads for the completed array 22.

Referring briefly to the timing diagram in FIG. 10, it will be noted that the winding period and the indexing period together form a row winding cycle having a time period of two seconds. The actual winding time in the winding period for a row of solenoids is less than two seconds and therefore the table 34 is oscillating at a higher speed than the motor output speed of 300 r.p.m. This is provided for by a step-up in speed which is provided for by the gear drive for table 34, shown in FIGS. 2 and 3, including a segment gear 66 that also provides for the dwell time of the table 34 during the indexing period. A portion of this gear drive also provides for a step-down in speed (10:1) for moving the indexing table and the head 28 at the row winding cycle rate. In the construction of the preferred embodiment as shown, the speed is first reduced from 300 r.p.m. to 30 r.p.m. (10:1) for the operation of the indexing table 36 and head 28 and stepped-up (12:1) for operating the oscillating table 36 at a speed of 360 r.p.m. during the winding period only. Because of the dwell time between motions of the oscillating table 34, during the indexing period, the total number of circular movements of the table 36 during each row winding cycle of two seconds is only ten which is the same number of revolutions each reel unit 52 makes in a row winding cycle.

Figures 2, 3:
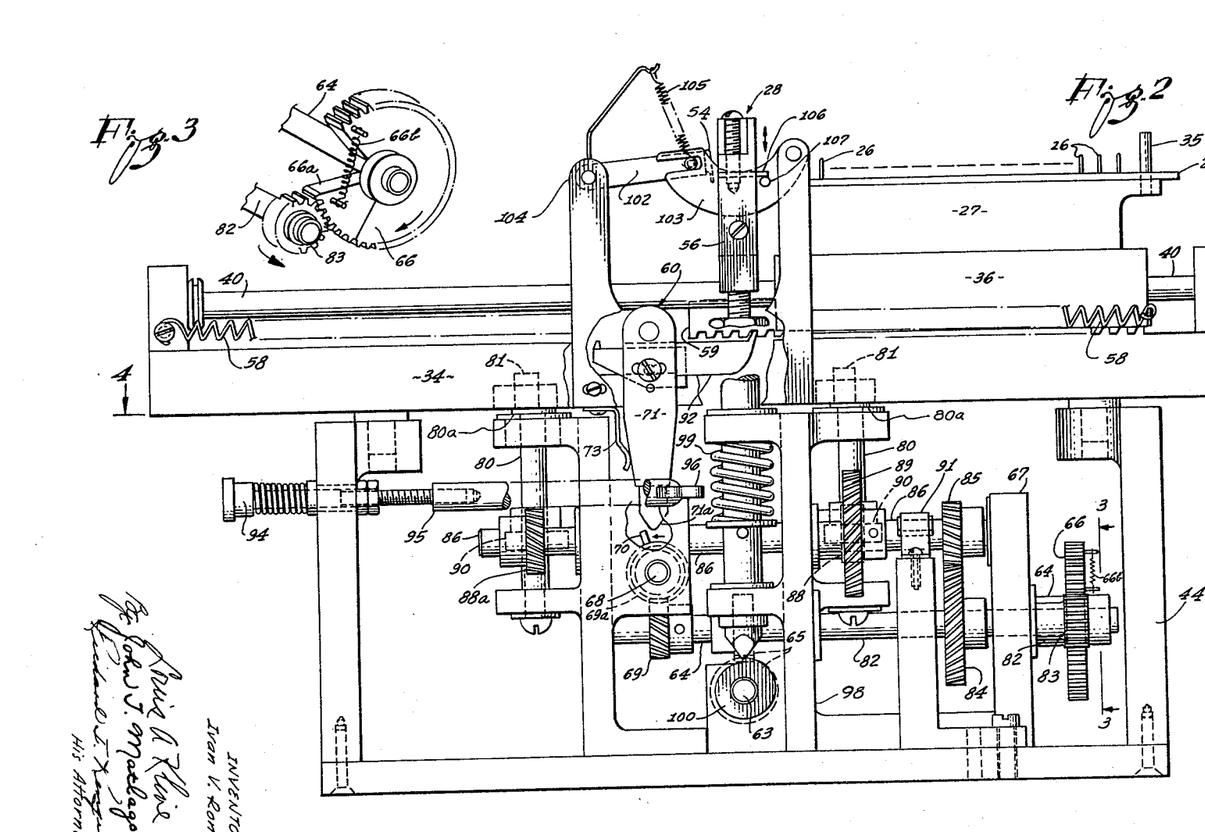
FIG. 2 is a partial front view of the lower portion of the machine, shown in FIG. 1.
FIG. 3 is a detail view of a portion of the gear drive including a segment gear for producing controlled time periods of oscillation of the movable winding tables, shown in FIGS. 1 and 2.
Figure 4:
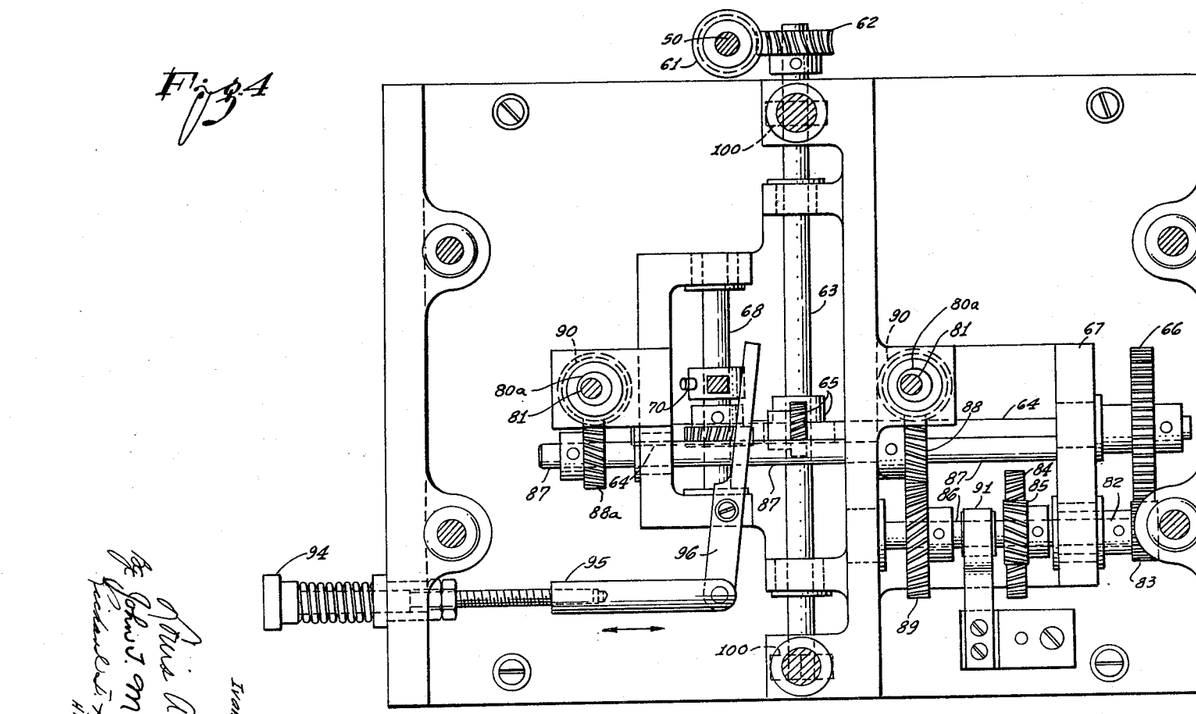
FIG. 4 is a top view of the gear drive located below the winding tables shown in FIG. 2 and taken along the line 4—4 of FIG. 2.

Referring now to FIGS. 2, 3 and 4 for a detailed description of the drive mechanism for producing the desired movements of the winding tables 34 and 36 and head 28, the drive mechanism is shown in FIG. 4 to be coupled to the main shaft 50 by a gear train including a worm gear 61 mounted on the lower portion of the main drive shaft 50. This gear 61 engages with a helical gear 62 mounted on the end of a lower transverse drive shaft 63, to drive the shaft 63 at a reduced speed of one revolution for every ten revolutions of the main drive shaft 50. During a single revolution of the lower shaft 63, one row of solenoids of the array 22 is completely wound in a row winding cycle.

The control of the head movement is provided by two cams 100 that are mounted directly on either end portion of the drive shaft 63. The peripheries of these cams 100 engage the lower ends of respective head mounting assemblies 56 (FIG. 2) to produce the head 28 and follow bar 54 motion illustrated in FIGS. 10(c) and 10(d) of the timing diagram. Thus, the head 28 is driven vertically through a cycle of vertical motion during each complete revolution of the drive shaft 63 and the position of the head 28 at any time during a row winding cycle is determined by the location of the cam follower end portions of head mounting assemblies 56 on the peripheries of the respective cams 100. The cams 100 provide a uniform rate of upward travel of the head 28 except at the beginning of the winding period as indicated by the timing diagram in FIG. 10(c).

The indexing operation is controlled and produced during the indexing period of each row winding cycle. A transverse shaft 64, visible in FIG. 4, is driven (1:1) by the drive shaft 63 by helical gears 65 mounted on shafts 63 and 64, respectively. The segment gear 66 (FIG. 3) is mounted on one end of the shaft 64 for driving a gear train for moving the oscillating table 34. As shown in FIGS. 2 and 4 the other end of shaft 64 drives a shaft 68 (1:1) by gears 69 and 69a whereby a tripper pin 70 on shaft 68 actuates the escapement member 71 by engagement with the lower end 71a to produce the horizontal indexing motion of the indexing table 36. Thus, the indexing operation is produced once every revolution of shaft 63 in each row winding cycle as illustrated by the timing diagram in FIG. 10(a). The escapement assembly 60 provides the two-step incremental motion which will be described later in description of FIGS. 5 to 7.

The oscillating motion of the table 34 is produced by shafts 80 including plates 80a (FIG. 4) and eccentric shaft portions 81. Portions 81 project into the bottom of the oscillating table 34 to oscillate the same. The shafts 80 are rotated ten revolutions for each revolution of the drive shaft 63 by a gear train including the segment gear 66 mounted on the transverse shaft 64. As shown in FIG. 3, the segment gear 66 drives a shaft 82 through a spur gear 83 to provide a step-up in speed of 3 to 1. The shaft 82, in turn, drives an upper shaft 85 through helical gears 84 and 85, and a helical gear 89 on shaft 86 engages helical gear 88 (FIG. 4) to drive shaft 87 at twelve times the speed of drive shaft 63.

The two eccentric shafts 80 (FIG. 2) are coupled to shaft 87 through respective helical gears 90 and gears 88 and 88a to oscillate the table 34. Although the speed increase through this gear drive train is twelve times the speed of drive shaft 63, the oscillating table 34 will only complete ten complete circular motions for every revolution of the shaft 63 because of the dwell time provided by the operation of the segment gear 66. Thus, for each revolution of the shaft 63, a set of solenoids 20, each having ten turns, is wound about pins 26 of the indexed row. As shown in FIG. 8d, ten turns of the solenoid winding must be made to complete the solenoids 20 and this is accomplished during one revolution of shaft 63, the time period of a row winding cycle. Accordingly, the oscillating table 34 completes ten circular movements during each revolution of the shaft 63. As a result of ten circular movements of the table 34, during each winding period, a row of solenoids 20 is wound on each row of pins 26 as each row is indexed under the head 28.

During the dwell time provided by the operation of the segment gear 66, the indexing table 36 is positioned for winding the next row of solenoids 20, and the head 28 and follow bar 54 are positioned near the bottom of the corresponding row of pins 26 on which the solenoids 20 are to be wound. As shown in FIG. 3, the segment gear 66 includes a movable segment 66a which moves to the position shown in FIG. 3 against spring 66b when the movable segment 66a engages the spur gear 83. During the dwell time interval, the segment 66a is thus moving against the force of spring 66b and the rotation of the shaft 64 is not transmitted to the spur gear 83 or the gear drive for the oscillating table 34. The dwell time provides an interval in the motion of table 34 for indexing the table 36 and positioning the head 28 and follow bar 54 to the next row of pins 26 of the array form 24. As shown in FIG. 3, the segment 66a travels one-sixth of the total circumference of the gear 66. As a result, a dwell time interval is provided which is one-sixth of the row winding cycle since the segment gear 66 rotates one complete revolution in a row winding cycle illustrated in the timing diagram of FIG. 10.

In order to prevent the table 34 from continuing oscillating on into the indexing period because of the inertia of the table 34 and the gear drive train therefor, a drag brake 91, shown in FIGS. 2 and 4, continuously engages the drive shaft 86 to stop the gear train and the oscillatory motion of the table 34 when the segment 66a engages gear 83 during each revolution of the segment gear 66. As will be evident from the description to follow later, the position of the oscillating table 34 is accurately determined in order to provide for lateral clearance of the pins 26 and the feed tubes 29 of the head 28 during indexing since the feed tubes 29 do not rise high enough to pass over the pins 26.

Figure 5:
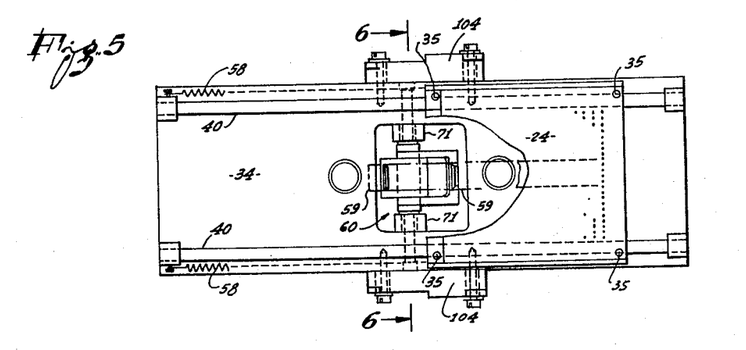
FIG. 5 is a top view of the lower portion of the machine shown in FIG. 2 with certain parts removed and other parts broken away to show the arrangement of the escapement apparatus which produces intermittent, linear indexing movement of the upper winding table for sequentially positioning rows of pins of an array form for sequentially winding rows of solenoids of the solenoid array.

In FIGS. 5 to 7, the details of the preferred embodiment of the machine are shown for indexing the table 36 to sequentially position each row of pins 26 of the array form 24 under the head 28. In FIG. 5, which is a top view of the table 34, with portions of the indexing table 36 and solenoid array form 24 broken away, the escapement assembly 60 is shown to include the rack 59, fastened to the underside of indexing table 36, and an escapement trunnion 71 the sides of which are pivotally supported by pins 59a in a cavity provided on the underside of table 34.

In FIG. 6, which is a sectional view taken along the line 6—6 of FIG. 5, the trunnion 71 is shown having a lower end portion 71a which engages the tripper pin 70. The escapement assembly 60 is actuated by the tripper pin 70 at the beginning of each indexing period to permit the indexing table 36 to move horizontally to position the next row of pins 26 under the head 28. The escapement trunnion 71 is mounted in the oscillating table 36 to pivot about the upper end portions about pins 59a when the lower end portion 71a is engaged by tripper pin 70. When the trunnion 71 is so moved, a double escapement member 92, fastened between the upper ends of the trunnion 71, indexes in the teeth of rack 59, as shown in FIG. 7, to produce the indexing movement during each indexing period, as illustrated by the timing diagram in FIG. 10(a). The escapement member 92 has two upwardly projecting teeth 92a and 92b on the opposite ends thereof and only one of these teeth can seat between the teeth in the rack 59 at any one time. When the escapement 60 is actuated, the tooth 92a is moved out to disengage the rack 59 and the tooth 92b is moved into engagement with rack 59 as shown by dashed lines in FIG. 7. In the process, the rack 59 is moved by the force exerted by tension springs 58 which are pulling in the direction of the arrow shown in FIG. 7. The rack 59 moves one-half of the distance between the teeth of the rack because the teeth 92a and 92b are spaced so that one is between the two teeth of the rack 59 when the other is above a tooth of the rack 59. After the pin 70 on shaft 68 passes the trunnion-end portion 71a, the trunnion 71 is returned to its normal position as shown by the solid lines in FIG. 7 but engages the rack 59 between the next two teeth of the rack and the rack 59 moves the remainder of the distance necessary to index the table 34. The return movement is produced by the force exerted on the trunnion 71 by a spring member 73 tending to move the trunnion 71 to its normal position. The operation of the escapement assembly 60 divides the indexing movement of the table 36, occurring each indexing period, into two separate movements rather than a single movement which would produce a sudden and excessive strain on the conductors 32.

The escapement assembly 60 can also be operated manually by depressing an indexing button 94 of a manual indexing actuator shown in FIGS. 1, 2 and 4. As shown, the button 94 is mounted on the end of an adjustable shaft 95 that is connected to a lever arm 96. The lever arm 96 is mounted as shown in FIG. 4, to engage the end portion 71a of the escapement trunnion 71 to thereby actuate the escapement assembly 60 to index the table 34 in the manner previously described.

Referring to FIG. 1 briefly, it will be noted that the head 28 is mounted transversely across the tables 34 and 36 to bridge the solenoid array form 24. The head 28 is supported on either side thereof by movable, vertical head mounting assemblies 56 mounted on each side of the tables, as shown. Both of the head mounting assemblies 56 are adjustable to adjust the height of the head 28 and are slidably mounted in a vertical support member 98, as shown for the one visible in FIGS. 1 and 2. The head mounting assemblies 56 are biased downwardly by compression springs 99 and the cam follower lower end portions are formed and disposed to follow on the periphery of cams 100 to produce the up and down, vertical travel of head 28, as illustrated by the timing diagram in FIG. 10(c). As noted previously, the uniform upward, vertical travel of head 28 produces a uniform pitch in the turns of the solenoids which is necessary for winding single-layer solenoids 20.

Also as shown in FIG. 1, the follow bar 54, which positions the conductors 32 fed from the feed tubes 29, is movably supported by arms 102 and levers 103 mounted on yokes 104. The arms 102 and slotted, arcuate levers 103 are pivotally mounted on the respective ends of the respective yokes 104 to be moved in synchronism with the head 28. The follow bar 54 is urged upwardly by tension springs 105 connected to respective arms 102. As shown for one side in FIG. 2, the levers 103 are made to follow the movement of head 28 by lateral head projections 106 which ride on the top of pins 107 held in the respective members 103, as shown. Pins 107 extend into the path of the projections 106 on the head 28 whereby the levers 103 are made to follow the head motion. The motion of the head 28 is thereby transmitted to the follow bar 54 and by proper arrangement of the levers 103, the follow bar 54 is made to travel twice the distance of the head 28 to clear the pins 26 during the indexing period.

Figures 8A, 8B, 9A, 9B:
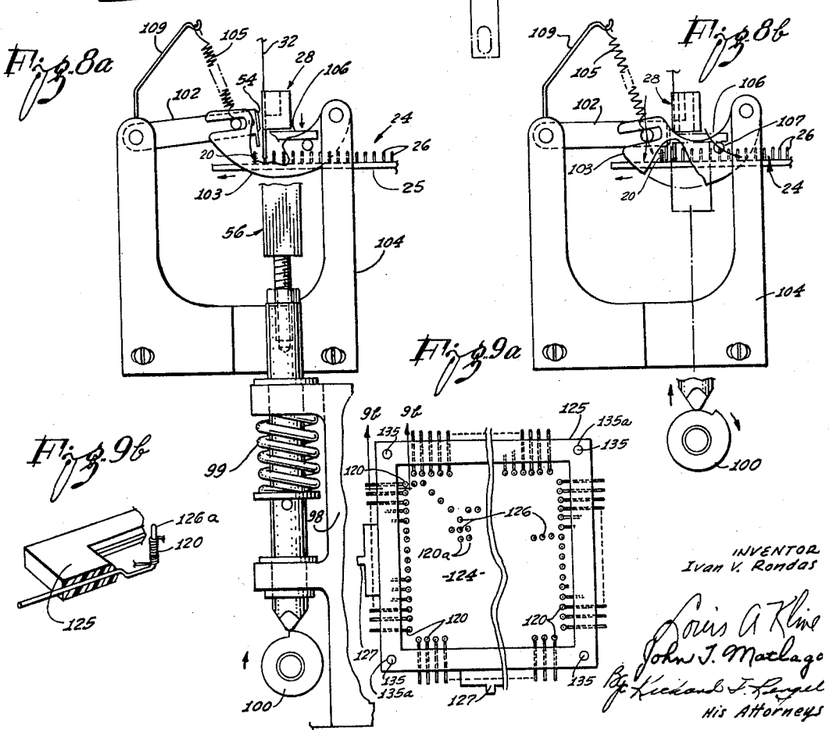
FIGS. 8a and 8b are partial views of portions of the machine shown in FIGS. 1 and 2, showing the relative positions of the conductor feeding and guiding apparatus and the follow bar after winding the first row of solenoids of a solenoid array and at the beginning of winding the second row of solenoids of the same array to illustrate this portion of a cycle of operation of the machine.
FIG. 9a is a top view of an alternate solenoid array form for producing a solenoid array and a frame positioned on said form for showing the winding of a coordinate solenoid array module including the making of terminal connections in the winding operation of the machine.
FIG. 9b is a perspective, sectional view of a portion of the frame shown in FIG. 9a and taken along the line 9b—9b of FIG. 9a, to show the details of the frame and the terminals.
Figures 8C, 8D:
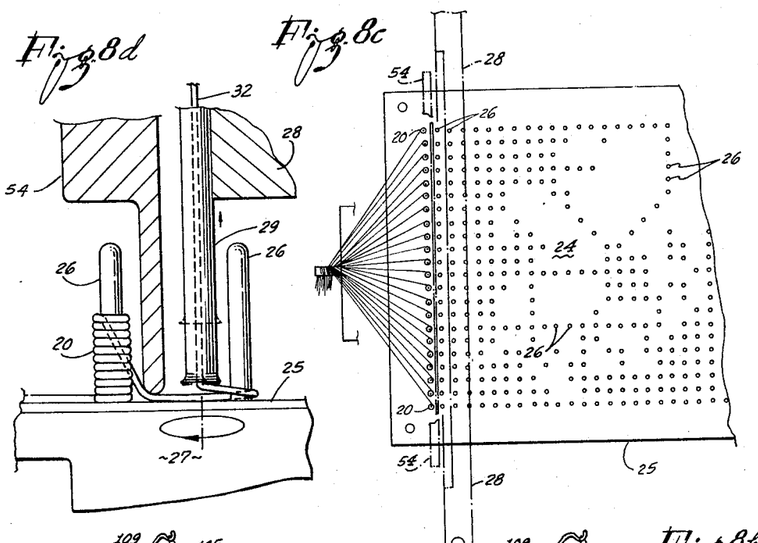
FIG. 8c is a top view of the solenoid array form of the machine and a portion of the mounting block for this form to further illustrate the showings of FIGS. 8a and 8b.
FIG. 8d is a detail view of a portion of the apparatus as shown in FIG. 8b and enlarged for illustrating the details of the solenoid winding operation of the machine of FIG. 1.

Reference will next be made to FIGS. 8a, 8b, 8c and 8d for a detailed description of the operation of the head 28 and follow bar 54 in the winding of a solenoid 20 on an array form 24. FIG. 8a shows the head 28 and the follow bar 54 in positions relative to the solenoid array form 24 immediately after positioning the indexing table 36 above the second row of pins 26 of the solenoid array form 24 for winding the second row of solenoids 20, but before lowering the head 28 and follow bar 54, to illustrate a typical winding operation. FIGS. 8b and 8d show the head 28 and follow bar 54 lowered into respective positions for beginning the winding of the second row of solenoids and immediately after approximately one-half of one circular movement of the oscillating table 34, i.e., at the start of the winding period shown in the timing diagram in FIG. 10. FIG. 8c is a top view of the array form 24 with the head 28 and follow bar 54 indicated to show the relative positions illustrated in FIGS. 8a and 8b.

Referring now to the timing diagram, shown in FIG. 10, in conjunction with FIGS. 8a, 8b, 8c and 8d, for a description of the detailed operation, a row winding cycle of the preferred machine begins with a winding period and ends with an indexing period. During the winding period, the first row of solenoids 20 is wound on the first row of pins 26. At the end of the winding period the oscillating table 34 is stopped and the feed tubes 29 of head 28 are positioned between the pins 26 of the first row and the follow bar 54 is high enough to clear the tops of the first row of pins 26. The head 28 and follow bar 54 continue to rise during the movement of the indexing table 36. As shown in FIG. 8a, the indexing movement of the table 36 has been completed and the head 28 and follow bar 54 are about to move down, as indicated by the position of cam 100. In the indexing movement of table 36, the feed tubes 29 are indexed from positions between the pins 26 of the first row to positions between the pins 26 of the second row of the array form 24. Thus, the positions of the head 28 and follow bar 54, as shown in FIG. 8a, are the proper positions during the indexing period of the first row winding cycle and more specifically at the completion of the horizontal motion of the indexing table 36, which motion is indicated in FIG. 10(a) to be divided into two time intervals.

At the end of the second time interval of horizontal motion of indexing table 36, both the head 28 and follow bar 54 are shown in FIG. 8a to have reached the top of their travel and about to begin their downward travel to position the conductors near the bottom of the second row of pins 26 for winding the second row of solenoids 20. As shown in FIGS. 8b and 8d, the head 28 and the follow bar 54 have completed their downward travel and are shown in their respective positions at the beginning of the winding period for winding the second row of solenoids 20. As shown by the details in FIG. 8d, the oscillating table 34 has only completed approximately one-half its first circular movement to produce one-half of the first turn of the winding of the second row of solenoids 20. During this first portion of the winding period, the head 28 and follow bar 54 are not moved up in order to place most of the first turn of each solenoid 20 flat against the plate 25. This deviation from the uniform vertical movement of head 28 and follower 54 is indicated by the timing diagram in FIGS. 10(c) and 10(d) and is provided by a "flat spot" on the cam 100. At the end of this winding period, the oscillating table 34 will have completed ten circular movements winding the conductors 32 about the pins 26 to produce a row of twenty-two, ten-turn solenoids 20 identical to the solenoid 20 shown in FIG. 8d. The row winding cycles are continued until a total of twenty-six cycles are completed at which time the solenoid array 22 of twenty-six rows will have been completed.

Referring briefly to FIG. 1, the conductor supply 30, including rotatable supply reel units 52, is shown for supplying twenty-two conductors 32 to the respective feed tubes 29 of the head 28. The reel units 52 rotate on respective vertical axes to produce axial rotation of each of the conductors 32 to prevent twisting of these conductors during the winding of the solenoids 20. The conductor supply 30 and the details thereof are shown in FIGS. 11 to 14.

Figure 11:
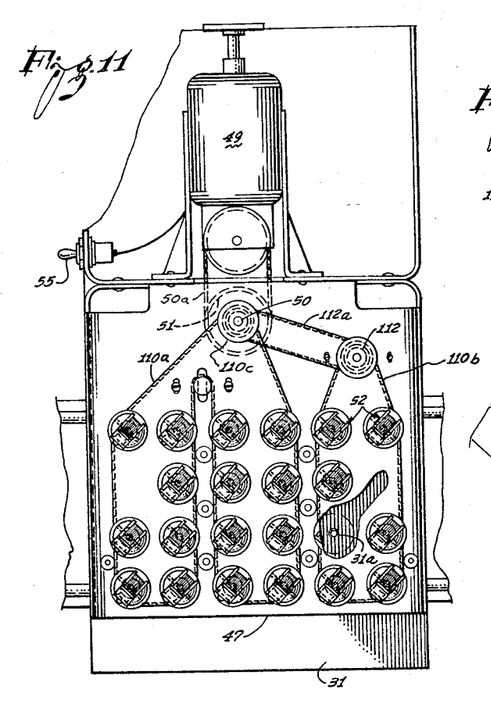
FIG. 11 is a top view, partly broken away, of the preferred embodiment of the solenoid winding machine shown in FIG. 1, for showing the conductor supply apparatus including conductor reel units and the motive power source for driving the machine shown in FIG. 1.

In FIG. 11, the rotatable reel units 52 are shown rotatably mounted in a support plate 47 and coupled to the main drive shaft 50 by a belt drive including a first belt 110a coupled to four rows of reel units 52 and a second belt 110b coupled to two rows of reel units 52, as shown. The first belt 110a couples a double pulley 110c on the main drive shaft 50 directly to fifteen of the twenty-two reel units 52. The remaining seven reel units 52 are driven from the main shaft 50 by the second belt 110b which is coupled to the shaft by pulley 112 and belt 112a.

Figure 12:
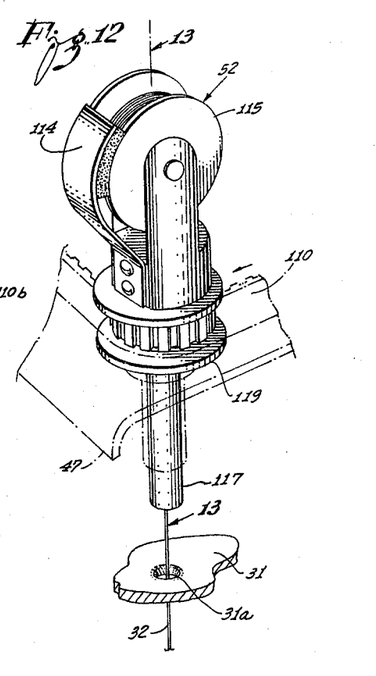
FIG. 12 is an enlarged perspective view of one of the conductor reel units shown in FIG. 11.
Figures 13, 14:
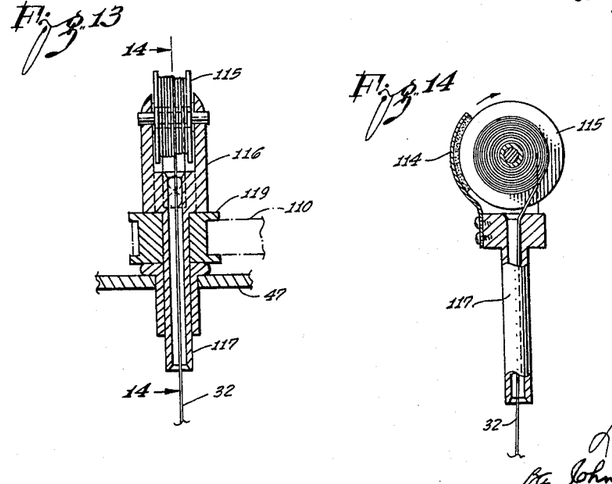
FIG. 13 is a sectional view of the reel unit shown in FIG. 12 and taken along the line 13—13 of FIG. 12.
FIG. 14 is a side view of the reel unit shown in FIG. 12, partly in section and having certain parts removed to show certain details thereof.

In FIGS. 12, 13 and 14 the details of one of the twenty-two identical reel units 52 are shown. The twenty-two conductors 32 that are supplied from respective reel units 52 are drawn therefrom under tension through the respective feed tubes 29 to the solenoid array form 24. During winding of the solenoids 20 and indexing movements, the conductors 32 are pulled from respective reels 115 through hollow shafts 117, apertures 31a in guide plate 31, and feed tubes 29 to be wound on pins 26 of respective columns of the array. As shown in FIG. 12, each reel unit 52 includes a drag brake 114 that is spring biased against the reel 115 to produce the required tension on the conductor 32 being supplied from the reel 115 during winding of the solenoids 20. The drag on reels 115 is uniform (e.g., ¼ oz.) and the combined drag is controlled whereby the springs 58 (FIG. 1) can overcome the combined drag to move the indexing table 36 in the winding operation and to move the indexing table to actuate switch 57 (FIG. 1) after the last row of solenoids 20 has been wound. The reel 115 is rotatably mounted on a yoke 116 and the conductor 32 is fed down the hollow shaft 117. Each of the reel units 52 also includes a pulley 119 which is mounted on the hollow shaft 117 whereby the reel units 52 are driven by the belts 110a and 110b as shown in FIG. 11.

In FIG. 11, the motive power source for the machine is shown to include motor 49 for driving the main drive shaft 50 through a belt drive 51. In the construction of the preferred illustrative embodiment of the invention, the motor 49, which has an output shaft revolving at 300 r.p.m., for example, drives the main drive shaft 50 at a speed of 300 r.p.m. Each of the reel units 52 is driven from the main drive shaft 50 which is rotated at 300 r.p.m. which corresponds to the rate at which the turns are wound to form the solenoids 20 on the pins 26 of the solenoid array form 24. As noted previously, the twenty-six rows of the solenoid array 22 are wound in twenty-six cycles of two seconds each or fifty-two seconds.

In FIGS. 9a and 9b, an alternate solenoid array form 124 is shown, which can be used in the machine shown in FIG. 1, instead of the form 24. Form 124 has a molded or cast terminal frame 125 disposed thereon, and is shown for winding solenoids 120a of a solenoid array including winding terminal leads 120 of the solenoid array on terminal pins 126a. The array form 124, including a die plate and pins 126, is removably secured to a mounting block 127 having terminal lead winding posts as shown. The conductors 32 have not been shown in FIG. 9a in order to more clearly illustrate the structure of the alternate arrangement. The mounting block 127 is similar to mounting block 27 shown in FIG. 1, which is removably secured to the indexing table 36. In a winding operation, the mounting block 127 is secured to the indexing table 36, shown in FIG. 1, by suitable means (not shown) and replaces the mounting block 27 shown in FIG. 1 for winding an array of solenoids 120a thereon. The array form 124 is positioned on the mounting block 127 by passing guide posts 135 through apertures (not shown) in the corners of the die plate of the array form 124. The terminal frame 125 is positioned over the die plate of the array form 124 by passing guide posts 135 through respective apertures 135a in the corners of the frame 125. By this arrangement of the terminal frame 125 and the array form 124 on the mounting block 127, the terminal pins 126a which are located at two of the opposite ends of the frame 125, are wrapped in the same winding operation that the solenoids 120a are wound around pins 126 and in the same manner that the pins 126 are wound.

After the alternate solenoid array form 124 has passed through the machine shown in FIG. 1 to complete a first array of solenoids 120a, a second solenoid array is wound on the same pins 126 but in the transverse direction. Thus, by rotating the mounting block 127 clockwise, ninety degrees, and passing the array form 124 through the machine a second time, a second array of solenoids 120a is wound on pins 126, i.e., a second layer of solenoid windings are formed over the first layer of solenoid windings. If it is undesirable to wind one solenoid over another and thereby form two layers of solenoids 120a, the windings of the second array of solenoids 120a can be wrapped directly on the pins 126 but above the windings of the first array of solenoids 120a. This is accomplished by adjustment of the range of vertical travel of the head 28 by means of the adjustable, vertical mounting assemblies 56 whereby the solenoids of the second array are wound above the windings of the first array of solenoids 120a. Thus, completed arrays of solenoids 120a employing the arrangement shown in FIG. 9a, includes the making of terminal connections for both of the first and second solenoid arrays which are disposed on a frame 125. In addition to providing a mounting frame 125 for terminal pins 126a, the terminal frame 125 also provides the periphery of a mold for investing the solenoids to produce a solenoid panel for a magnetic rod memory. From the foregoing description of FIGS. 9a, and 9b, it is clear that the terminal pins 126a may be provided on only two opposite sides of the frame 125 to form a single solenoid array contained within a frame 125 having terminal connections at only two ends or sides thereof. Also, the terminal pins 126a can be connected to the conductors without automatic winding of the same and terminal pins 126a can be connected to one another as desired.

Figures 15, 16, 17, 18, 19, 20:
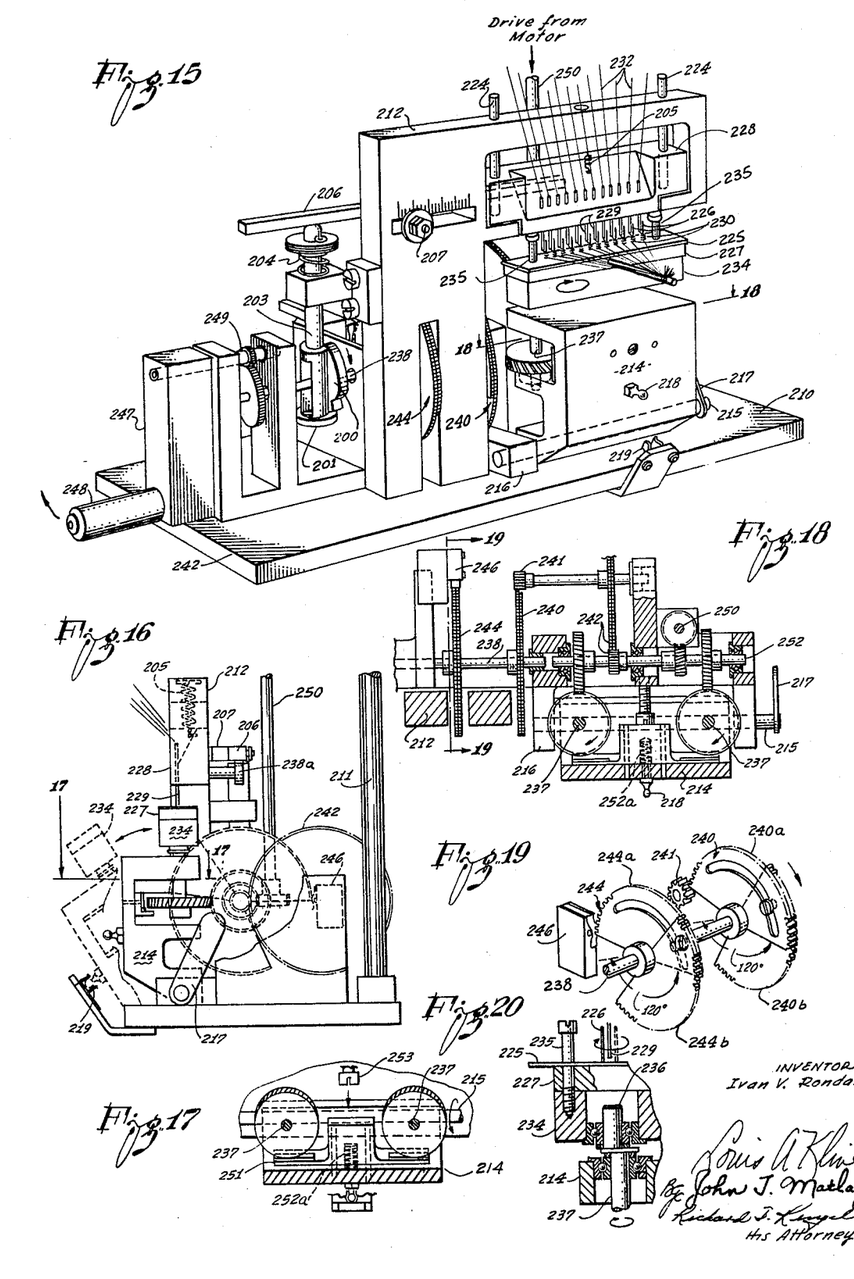
FIG. 15 is a perspective view of the solenoid winding machine of the alternate illustrative embodiment of the present invention for producing individual solenoids in which the number of turns of the solenoids is readily adjustable.
FIG. 16 is a right end view of the alternate embodiment of the invention shown in FIG. 15 with portions removed and broken away, to show the construction thereof.
FIG. 17 is a detail view of the machine shown in FIGS. 15 and 16, taken along the line 17—17 of FIG. 16, to show the gear braking arrangement therefor.
FIG. 18 is a top view of the gear drive of the machine shown in FIG. 15, partially in section as taken along the line 18—18 of FIG. 15.
FIG. 19 is a perspective view of a portion of the alternate machine shown in FIG. 15 taken along the lines 19—19 in FIG. 18, for showing the adjustable gear and cam for controlling the number of turns of the solenoids being wound by this machine.
FIG. 20 is an enlarged sectional view showing the eccentric drive for oscillating the winding table of the alternate machine shown in FIG. 15.

Referring now to FIGS. 15 to 20, an alternate embodiment of the solenoid winding machine is provided having the feature of winding individual solenoids 230 with an adjustable number of turns on a row of pins 226. Pins 226 are mounted in a mounting block 227 that is secured to an oscillating table 234. The solenoids 230 are formed from continuous length conductors 232 supplied from a conductor supply, such as the conductor supply 30 shown in FIG. 1. In order to avoid unnecessary duplication, the conductor supply and motive power source of the alternate embodiment of the solenoid winding machine, have not been shown since substantially the same arrangement is employed as shown in FIG. 1, with the exception that only twelve reel units 52 (FIG. 1) are needed to supply the twelve conductors 232 for the alternate machine shown in FIG. 15. The conductor supply is supported by a vertical support member 211, shown in FIG. 16. As shown in FIG. 15, a row of solenoids comprises twelve individual solenoids 230 which are being wound simultaneously and only twelve conductors 232 are supplied to twelve feed tubes 229 of the head 228. Thus, only twelve of the reel units 52, as shown in FIG. 1, are required to supply the twelve conductors 232 although it is realized that the number of solenoids 230 in a row is illustrative and is not limited to twelve and a greater or lesser number of solenoids may comprise a row and only a single solenoid may be wound by the machine shown in FIG. 15. Accordingly, a greater or lesser number of conductors 232 and reel units therefor may be required to wind a corresponding number of solenoids 230 in either embodiment of the present invention.

Referring now to FIG. 15 for a detailed description of the solenoid winding machine of the alternate embodiment, the oscillating table 234 is shown to be movably supported for circular movement above a support member 214 and below a feed tube head 228. The head 228 is supported for vertical movement above the table 234 by a vertical support 212. The support member 214 for table 234 is pivotally mounted above a base plate 210 by means of a shaft 215 which is rotatably mounted in a base block 216, as shown. An arm 217 is secured to the end of shaft 215 in order to facilitate manual pivoting of the support member 214 and the table 234 about the axis of the shaft 215. Upon pivoting the support member 214 and table 234, outward about the axis of shaft 215, a projection 218 is secured between prongs 219 to removably secure the table 234 in an outward position, as shown by the dashed lines in FIG. 16, for the removal of the solenoids 230 from the pins 226. A stripper plate 225 has been provided to facilitate removal of solenoids wound on pins 226. The stripper plate 225 lies on mounting block 227 and has a row of small holes therein to accommodate the respective pins 226 and larger holes at each end of the row of pins 226 to accommodate guide posts 235. The upper ends of the guide posts 235 are enlarged to provide stripper plate stops which limit the travel of the stripper plate 225 after the solenoids 230 are stripped from the pins 226.

In the alternate solenoid winding machine shown in FIG. 15, the oscillating table 234 moves the winding pins 226 clockwise in circular paths around the respective feed tubes 229 to wind the conductors 232 around the respective pins 226. FIG. 20 is a detailed sectional view showing one of a pair of eccentric drives for moving the table 234 to produce the circular movement of the pins 226 around the respective feed tubes 229. A cavity in the underside of the table 234 receives eccentric end portions 236 of rotating shafts 237. As the shafts 237 rotate, the eccentric end portions 236 cause the table 234 to move in a circular path to revolve each of the pins 226 in the row around respective feed tubes 229 to wind conductors 232 on the pins 226 to produce a row of solenoids 230.

In FIG. 15, the feed tube head 228 is shown supported for reciprocal, vertical movement on guide rods 224 mounted in the vertical support 212 and the rate of upward, vertical movement of the head 228 provides for the pitch of the windings of the solenoids 230. As shown in FIG. 15, the vertical support 212 suspends the head 228 directly above the oscillating table 234 to locate the feed tubes 229 adjacent the respective pins 226. The vertical movement and the distance of travel of the head 228 are controlled by a head actuating lever 206 supported by an adjustable fulcrum member 207. A tension spring 205, which is connected between the upper portion of the support member 212 and the head 228 (FIG. 16), urges the head 228 upwardly to the top of its vertical travel. The end portion of the lever 206, which is next to head 228, rides on top of a roller 238a which is mounted on the back of the head 228 as shown in FIG. 16. The other end portion of the lever 206, which is visible in FIG. 15, engages the upper end of the cam follower 203 that is urged upwardly by a compression spring 204. The lower end plate 201 of the cam follower 203 rides on the periphery of the cam 200 which is rotated by a cam shaft 238. Shaft 238 rotates one revolution during a row winding cycle in which one row of solenoids 230 is completely wound. During the winding operation, the cam follower 203 moves downwardly to permit the head 228 to move upwardly by the upward force exerted by the tension spring 205. A uniform rate of movement of the head 228 produces a uniform pitch in the turns of the solenoids 230 being wound.

In FIG. 18 the details of the gear drive for the alternate embodiment of FIG. 15 are shown. The oscillating table 234 (FIG. 16) is driven at the same speed as a main drive shaft 250 which is, for example, coupled to a motor, such as the motor 49 shown in FIG. 11. The main drive shaft 250 drives a shaft 252, as shown in FIG. 18, and the drive shaft 252 drives both eccentric shafts 237 to move the table 234 whereby the winding pins 226 revolve around the respective feed tubes 229.

Referring again to FIG. 15, the vertical motion of the head 228 is controlled by cam 200 which is driven from the main drive shaft 250 through an adjustable gear drive providing a gear reduction, for example, 66⅔ to 1. As shown, the cam 200 is mounted on a cam shaft 238. In FIG. 18, the adjustable gear drive is shown to couple the cam shaft 238 to the drive shaft 252. The gears 240 and 241 of the adjustable gear drive provide, for example, an 8 to 1 gear reduction and the gears 242 provide an 8⅓ to 1 gear reduction.

Adjustment of the length of the arc of segment gear 240 and cam 244 determines the duration of the winding period in a winding cycle and consequently, the number of turns of the solenoids 230. The segment gear 242 is, for example, formed by cutting a gear having two-hundred teeth along its diameter to form two segments, 240a and 240b, each of which is left with ninety-six teeth. The segments are combined as shown in FIG. 19 to produce the segment gear 240 whose arc is adjustable (approximately 120°) to vary the winding time period in a winding cycle. The arc of the segment gear 240 can be varied to expose, for example, from ninety-six to one-hundred and sixty-five teeth. Thus, the minimum number of turns of the solenoids 230, according to this exemplary illustration, is thirty-two turns and the maximum number of turns of the solenoids is fifty-five turns. The cam 244 is formed in the same manner to provide segments 244a and 244b which are adjustable to have the same arc as segment gear 240. Since the segment gear 240 is adjustable in one tooth increments, the number of turns of each of the solenoids 230 is adjustable in one-third of a turn increments from thirty-two turns to fifty-five turns.

While the distance of vertical travel of the head 228 is determined by the adjustment of the segment gear 240, the adjustment of the length of the arc of the cam 244, which is always approximately the same as segment gear 240, determines the number of complete oscillations of the table 234. The periphery of the cam 244 actuates a microswitch 246 which completes the energizing circuit to the motor 49 (FIG. 11). The segment gear 240 and cam 244 are driven clockwise, as shown in FIG. 19, and the leading radial edge of the segment gear 240 engages gear 241 just after the head 228 is positioned at the bottom of its travel to begin winding the solenoids 230.

The leading radial edge of the cam 244 is slightly ahead of (leads) the leading radial edge of segment gear 240 whereby the microswitch 246 is actuated just before the segment gear 240 engages the gear 241. Thus, once the machine is started by closing the switch 246, the shaft 238 is driven an adjustable portion of one revolution to complete a row winding cycle having a winding period whose time duration depends upon the adjustment of the length of the periphery or arc of the adjustable segment gear 240 and adjustable cam 244.

As shown in FIG. 15, a metal block 247, having a handle 248 on one end thereof has the other end thereof mounted on a shaft 249 which is coupled to the shaft 238 through a 3 to 1 gear reduction. The weight of the block 247 provides a torque about the shaft 238 tending to hold the shaft 238 in a rest position where the radial edges of the segment gear 240 are positioned on either side of gear 241, and the radial edges of the cam 244 are positioned on either side of microswitch 246 so that the latter is not actuated by the cam 244. In operation, the handle 248 is manually operated to rotate the block 247 counterclockwise about the axis of shaft 249 to start a winding cycle and the winding period begins when the leading radial edge of cam 244 (rotating in a clockwise direction) actuates the microswitch 246. After the microswitch 246 is actuated and the teeth of segment gear 240 once engage the driving gear 241, the manual operation is discontinued and the machine proceeds under its own power through a winding period to produce a row of solenoids 230 having the desired number of turns according to the adjustment of the segment gear 240 and the cam 244, i.e., until the trailing edge of cam 244 passes the microswitch 246 to open the circuit to the motor.

After the row of solenoids 230 has been wound, the table 234 and support 214 are pivoted outwardly on shaft 215 to the position shown in dashed lines in FIG. 16. When the table 234 is in this position, the stripper plate 225 is raised on guide posts 235 to strip the completed row of solenoids 230 from the pins 226.

It should be noted that when the table 234 is positioned outwardly for the removal of the row of solenoids 230, the gears on drive shafts 237 are disengaged from the respective gears on the drive shaft 252. Since these sets of gears must mesh when the table 234 is returned to the winding position, a brake 251 has been provided which engages the gears on the shafts 237 when the support 214 is positioned outwardly, as shown in FIG. 17. The brake 251, which has end portions engaging the respective gears as shown, is movably supported on the support member 214, and by means of a compression spring 252a, is urged into engagement with the gears on shafts 237. The brake 251 releases the gears on the shafts 237 when engaging a brake post 253 as the support member 214 and table 234 are returned to the winding position. Thus, the brake is released to be disengaged from the gears on shafts 237 when the sets of gears mesh.

In the light of the above teachings, various modifications and variations of the present invention are contemplated and will be apparent to those skilled in the art without departing from the spirit and scope of the invention.

I claim:

1. An electrical solenoid array winding machine comprising: a movable support and groups of solenoid forms disposed on said support in rows and columns in a planar array for removably receiving solenoid windings; conductor supply means for supplying a group of continuous conductors; guide means for guiding said group of conductors to respective solenoid forms of any single indexed group of said forms; drive means for moving said support to move the solenoid forms of any single indexed group about the respective guide means to simultaneously wind the conductors about the respective solenoid forms of said single indexed group; and indexing means coupled to said drive means and constructed and arranged for successively positioning each of predetermined groups of forms and guide means automatically for successively winding the respective continuous conductors on each of said predetermined groups of solenoid forms to produce a planar electrical solenoid array.

2. The electrical solenoid array winding machine according to claim 1 in which said indexing means includes means for moving said support to position each of said succeeding predetermined groups of forms for winding solenoids thereon and said latter means being constructed and arranged such that the indexing motion between at least two succeeding groups comprises an interrupted movement for decreasing the strain exerted on said conductors being fed to said solenoid forms.

3. An electrical solenoid array winding machine comprising: a support and successively aligned groups of solenoid forms disposed on said support constructed and arranged to removably receive solenoid windings; conductor supply means for supplying a group of continuous length conductors; guide means for guiding said group of conductors to respective solenoid forms of any single aligned group of said forms; indexing means constructed and arranged for automatically aligning each of said successively aligned groups of forms and said guide means; and common drive means providing relative movement of the solenoid forms and said guide means to simultaneously wind the continuous conductors about the respective solenoid forms of each of the successively aligned groups, said drive means being constructed and arranged to wind said solenoids so that corresponding solenoids in succeeding groups are wound from succeeding portions of respective continuous conductors to form serially connected solenoids which are readily removable from said solenoid forms.

4. The electrical solenoid array winding machine according to claim 3 in which means are provided to automatically interrupt the relative movement of said solenoid forms and guide means during the alignment of each of said predetermined groups of solenoid forms for winding the solenoids of each of said groups.

5. An electrical solenoid array winding machine comprising: a movable table providing a support for a solenoid array form including individual solenoid forms arranged in rows and columns; conductor supply means for supplying a group of continuous conductors; guide means for guiding individual conductors of said group to respective solenoid forms in at least one row for concurrently winding said group of conductors thereon; common drive means for producing a first relative movement of the solenoid forms and said guide means to wind the group of conductors about a group of the respective solenoid forms in said row; and indexing means coupled to said common drive means and constructed and arranged for automatically producing a second relative movement of the table and the guide means to accurately position sequential rows of solenoid forms and said guide means for sequentially winding rows of solenoids of the array so that at least two solenoids in different rows are formed from a single continuous length conductor.

6. An electrical solenoid array winding machine for producing parallel columns of series-connected solenoids, each of said columns being formed from a continuous length of conductor, said machine comprising: a movable table providing a support for an array of solenoid form projections arranged in parallel rows and columns; conductor supply means for supplying a group of continuous conductors for said parallel columns; guide means including a plurality of conductor guide tubes for guiding respective conductors of said group to respective solenoid form projections in at least one row for simultaneously winding said group of conductors thereon; common drive means constructed and arranged to produce a first relative movement of said table and the solenoid forms at a predetermined rate to concurrently wind the conductors fed from said guide tubes about respective solenoid form projections in said row to produce a group of single layer helical solenoids; and indexing means coupled to said common drive means and constructed and arranged for automatically interrupting said first relative movement for winding and producing a second relative movement of the table and the guide means for sequentially positioning the guide tubes to guide the conductors to predetermined succeeding rows for winding succeeding rows of solenoids of the array from said group of continuous conductors so that solenoids in respective columns are formed from respective ones of said continuous length conductors.

7. The electrical solenoid array winding machine according to claim 6 in which the conductor supply means includes a plurality of individual conductor supply units and means for continuously rotating said units at a slower rate than said predetermined rate to produce axial rotation of the respective conductors supplied therefrom at the overall average rate of winding the solenoids in the columns whereby twisting of the conductors during winding of the solenoids is prevented.

8. A solenoid winding machine comprising: a support and a non-rotatable solenoid form projection mounted on said support; conductor supply means for supplying a conductor under tension; means including a guide tube disposed substantially parallel to said form projection for guiding said conductor to the solenoid form projection for winding said conductor thereon; and drive means including adjustable segment gears constructed and arranged for producing relative annular movement of said support and said guide tube wherein the duration of said movement is controlled by adjusting the overall length of the periphery of said segment gears.

9. A solenoid winding machine for winding a high density planar array of solenoids for a magnetic thin-film rod memory comprising: a planar solenoid array form including a planar support and a high density planar array of closely spaced successive sets of solenoid form pins disposed on said support in closely spaced parallel columns and oriented normal to said support for removably receiving solenoids wound thereon; conductor supply means for supplying a set of continuous length conductors for said high density planar array of solenoids; conductor guide head means including a set of closely spaced conductor guides for receiving and individually guiding each of said conductors of said set to corresponding form pins of any indexed set of form pins disposed adjacent said guides, and means for supporting said head means for movement parallel to the axes of said indexed set of form pins of said planar array; means for supporting said solenoid array form to dispose successive sets of form pins for winding said plurality of conductors thereon; means supporting said guide head means and said solenoid array form for relative arcuate movement for winding said solenoids; common drive means for producing said movements of said guide head means and said solenoid array form including said head means movement causing the conductor guides to describe predefined arcuate paths about respective form pins of the indexed set for form pins in order to accurately wind the respective continuous length conductors to produce a set of solenoids; indexing means coupled to said common drive means including means for producing a relative indexing movement of said guide head means and said means for supporting said solenoid array form for sequentially disposing each one of the successive sets of form pins adjacent said set of conductor guides, said drive means further including winding interrupt means for interrupting said arcuate and parallel movements after winding any indexed set of solenoids and means for initiating said indexing movement to dispose the next set of form pins for winding the next set of solenoids, said drive means automatically producing said arcuate and parallel movements after interruption for indexing for winding said next set of form pins whereby the winding of the solenoid array is completed automatically in successive winding cycles for said successive sets of form pins.

10. The invention in accordance with claim 9 in which said winding interrupt means is constructed and arranged to interrupt said oscillatory motion when the conductor guides are positioned between the parallel columns of form pins whereby an unobstructed indexing movement of the conductor guides is provided between said parallel columns during indexing of the winding machine for winding successive sets of solenoids.

11. The invention in accordance with claim 9 in which said winding interrupt means is constructed and arranged to provide for a relatively long winding time period and a relatively short indexing time period each winding cycle, and said drive means includes means for producing a relatively uniform movement of the guide head means from said planar support each winding cycle during the winding time period and a relatively rapid movement of the guide head towards the planar support during the indexing time period in order to provide for uniformly winding the sets of solenoids in the same direction and for accurately controlling the pitch of solenoids of the array.

12. The invention in accordance with claim 9 in which the indexing means includes means constructed and arranged to interrupt the indexing movement to divide the indexing movement into at least two motions in order to prevent excessive strain on the conductors when indexing to successive sets of form pins of the array.

13. An electrical solenoid array forming machine comprising: solenoid winding means constructed and arranged to be automatically operated through successive winding cycles for forming a solenoid array including conductor supply means and conductor guide means for supplying and guiding a continuous length conductor for each of a plurality of groups of solenoids, and support means for supporting a solenoid array form including a plurality of successive sets of form pins and a plurality of groups of solenoid form pins to dispose a set of at least one form pin for each group in alignment with said conductor guide means for concurrently winding said set of at least one solenoid of each group in a winding cycle; operating means coupled to said solenoid winding means for automatically producing said successive winding cycles of the solenoid winding means wherein each of said winding cycles includes a winding time period for winding a set of solenoids and an indexing time period for positioning one of the successive sets of form pins, said operating means including common drive means coupled to said winding means and constructed and arranged for causing relative arcuate movement of said conductor guide means and said support means each winding cycle including a cycle of relative axial movement parallel to said set of form pins to control the pitch of said solenoids, and said common drive means producing a plurality of cycles of relative annular movement during the winding time period only for winding said conductors about said set of form pins in order to form at least one solenoid for each of said groups; and indexing means coupled to said drive means and constructed and arranged to produce a relative indexing movement of said conductor guide means and support means each winding cycle to dispose successive ones of said sets of form pins for winding solenoids of said groups of solenoids to form said solenoid array in a series of successive winding cycles.

14. The invention in accordance with claim 13 in which said conductor guide means includes follower means and guide tube means wherein said guide tube means guides the conductors to the bases of any one of the successive sets of form pins indexed for winding and said follower means follows behind the guide tube means in order to assist in guiding the conductors to said bases during indexing time periods of the winding cycles.

15. An electrical solenoid array forming machine comprising: first means capable of being automatically operated through successive operating cycles for forming a solenoid array, said first means including conductor supply means and conductor guide means for supplying and guiding a continuous length conductor for each of a plurality of groups of solenoids, and support means for supporting a solenoid array form including a plurality of successive sets of solenoid form pins and a plurality of groups of solenoid form pins to dispose a set of at least one form pin for each group in alignment with said conductor guide means for concurrently winding said set of one solenoid of each group in an operating cycle; second means coupled to said first means for automatically producing said plurality of successive operating cycles of said first means, each of said operating cycles including a winding time period in which a set of solenoids is being wound and an indexing time period in which one of said successive sets of form pins are positioned for winding; said second means including drive means coupled to said first means and constructed and arranged for causing said conductor guide means and said support means to produce an arcuate movement each operating cycle including a single cycle of transverse movement substantially parallel to the axes of said form pins during the winding time period to control the pitch of said solenoids during winding of the solenoids and a return transverse movement during the indexing period to provide for winding said solenoids in the same direction during the winding time period, and means coupled to said drive means for producing a plurality of cycles of annular movement for winding said conductors about said set of form pins during the winding time period of each operating cycle and interrupting the annular movements during the indexing time period of each operating cycle; and third means including indexing means coupled to said drive means and constructed and arranged to produce relative movement of said conductor guide means and support means during the indexing time periods to dispose successive ones of said sets of form pins for automatically winding the sets of solenoids of the solenoid array to produce a high density solenoid array in said plurality of successive operating cycles.

16. A machine for winding electrical solenoid coils in solenoid winding cycles comprising: a solenoid array form including an array of regularly spaced solenoid form pins; an oscillatory table adapted to removably support said solenoid array form; electrical conductor guide means; supply means for supplying individual electrical conductors to said guide means for guiding said conductors to an associated set of the form pins; driving means coupled to said table and to said supply means so that the table is oscillated relative to said conductor guide means to cause the individual conductors to be wound about respective form pins of said set and to cause the supply means to be rotated to cause a twist to be applied to the conductors to counter the twist imparted thereto on being wound upon said set of form pins.

17. The machine according to claim 16 in which said sets of solenoid form pins are arranged in rows on a plate removably secured to an indexing table slidably supported on said oscillatory table, indexing means coupled to said indexing table for controlling sliding movement of the indexing table so that each of said rows is successively indexed into association with the guide means, said indexing means being coupled to said drive means and operated by the driving means at the conclusion of each solenoid winding time period of an operating cycle of the machine.

18. The machine according to claim 17 in which the driving means includes oscillation interrupt means coupling the drive means to said oscillation table and constructed and arranged to interrupt the oscillation of said table during operation of the indexing means.

19. The machine according to claim 18 in which said indexing means includes restoring means, a toothed rack secured to said indexing table and an escapement member adapted to permit one-half of a tooth-space movement of said toothed rack upon operation of the indexing means and to permit a further one-half of a tooth-space movement of the rack during restoration of said indexing means by said restoring means.

20. The machine according to claim 16 in which said drive means includes a driving source and cam means coupling said source to said guide means to move the guide means in a direction parallel to the axes of the form pins to control the pitch of the solenoids.

21. The machine according to claim 20 in which said drive means also includes an adjustable segment gear having two relatively adjustable segments, said segment gear coupling the drive source to said cam means to control the extent of movement of the guide means by adjustment of said segment gear.

22. The machine according to claim 21 in which said drive means also includes a segment cam having two relatively adjustable segments, said drive means being constructed and arranged to control the number of oscillations of the oscillatory table by the adjustment of the segments of said segment cam.

References Cited by the Examiner

UNITED STATES PATENTS

| | | | |
|---|---|---|---|
| 1,905,121 | 4/1933 | Adam | 317—118 |
| 1,936,963 | 11/1933 | Dutzmann | 317—118 |
| 2,426,522 | 8/1947 | Porter | 140—71.5 |
| 2,855,159 | 10/1958 | Mallina | 242—7 |
| 2,862,671 | 12/1958 | Dimond | 242—7 |
| 2,948,953 | 8/1960 | Rayburn | 242—9 |
| 2,963,051 | 12/1960 | Shaw et al. | 140—93 |
| 3,019,822 | 2/1962 | Jacobson | 140—71 |
| 3,106,351 | 10/1963 | Fulton | 242—9 |
| 3,028,108 | 4/1962 | Bos et al. | 242—7 |

FRANK J. COHEN, *Primary Examiner.*

RUSSELL C. MADER, MERVIN STEIN, B. S. TAYLOR, *Assistant Examiners.*